(12) United States Patent
Andre

(10) Patent No.: US 12,338,741 B2
(45) Date of Patent: Jun. 24, 2025

(54) POWER CAPTURE DURING COAST DOWN OF TURBINE GENERATOR

(71) Applicant: Florida Power & Light Company, Juno Beach, FL (US)

(72) Inventor: Steven D. Andre, Boca Raton, FL (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 18/514,028

(22) Filed: Nov. 20, 2023

(65) Prior Publication Data

US 2025/0163822 A1    May 22, 2025

(51) Int. Cl.
*F01D 15/10* (2006.01)
*H02K 7/18* (2006.01)

(52) U.S. Cl.
CPC .......... *F01D 15/10* (2013.01); *H02K 7/1815* (2013.01); *F05D 2220/764* (2013.01)

(58) Field of Classification Search
CPC ............................. F01D 15/10; F05D 2220/764
See application file for complete search history.

(56) References Cited

U.S. PATENT DOCUMENTS

| | | | |
|---|---|---|---|
| 8,371,230 B2 | 2/2013 | Kumar | |
| 9,103,317 B2 | 8/2015 | Garcia | |
| 10,082,089 B2 | 9/2018 | Alexander et al. | |
| 10,670,028 B2 | 6/2020 | Rollins et al. | |
| 2008/0049887 A1* | 2/2008 | Bode | G05B 23/0221 377/16 |
| 2012/0000204 A1 | 1/2012 | Kesseli et al. | |
| 2015/0204205 A1* | 7/2015 | Shaban | F01D 15/10 290/52 |
| 2022/0316443 A1 | 10/2022 | Zhang et al. | |

FOREIGN PATENT DOCUMENTS

EP    3815954 A1    5/2021

* cited by examiner

*Primary Examiner* — Tulsidas C Patel
*Assistant Examiner* — Thomas K Quigley
(74) *Attorney, Agent, or Firm* — Tarolli, Sundheim, Covell & Tummino LLP

(57) ABSTRACT

A system for generating power includes a turbine generator for generating alternating current (AC) power and a power electronics module that provides a first signal to the turbine generator to switch an operating mode of the turbine generator from an off mode to a startup mode. The first signal is variable frequency power. The system includes a controller that provides a second signal that causes the turbine generator to switch from a normal operating mode to a coast down mode. In the startup mode, the turbine generator accelerates to a full rotational rate and in the coast down mode, the turbine generator decelerates from the full rotational rate to a stop over an interval of time. The system includes a power converter that converts rotational inertia by the turbine generator into direct current (DC) power responsive to the turbine generator operating in the coast down mode.

20 Claims, 9 Drawing Sheets

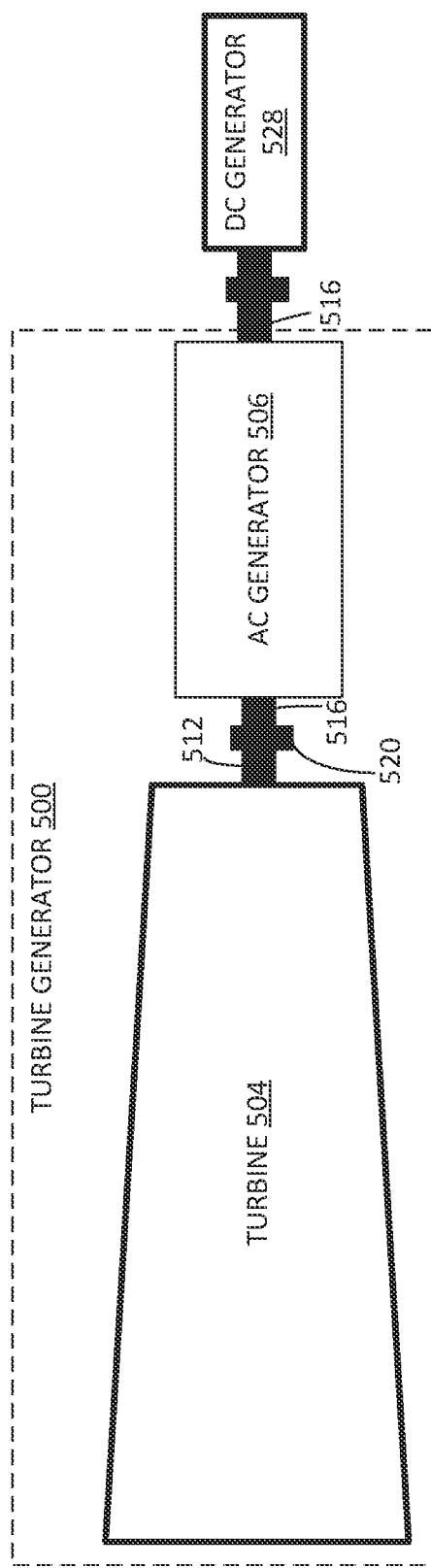
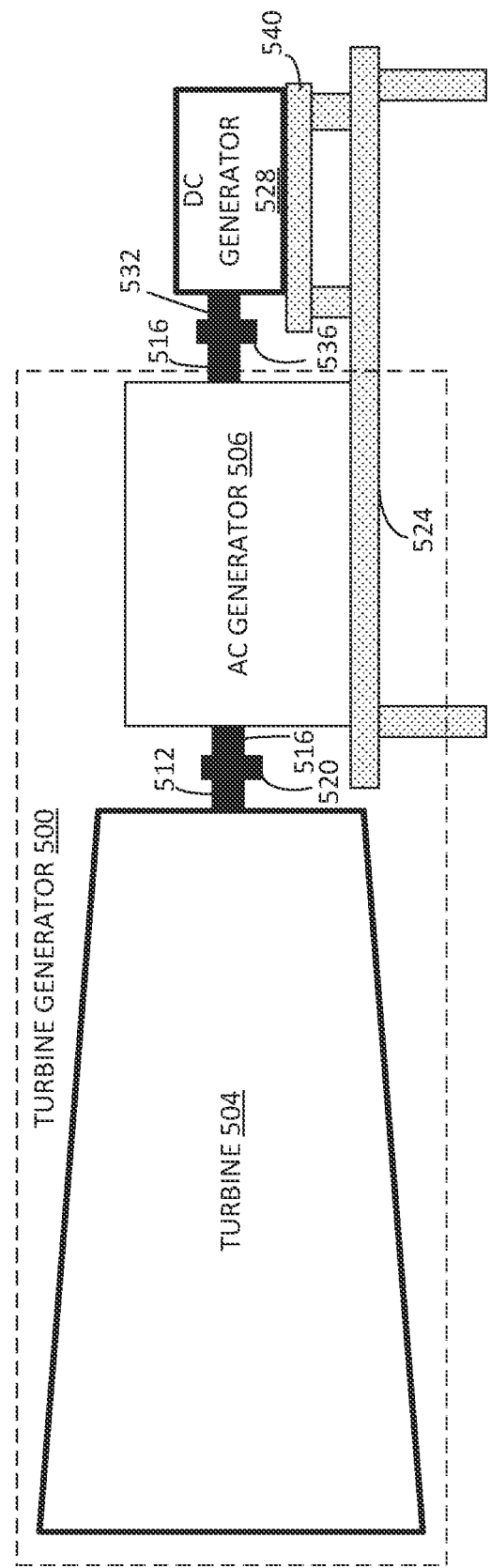

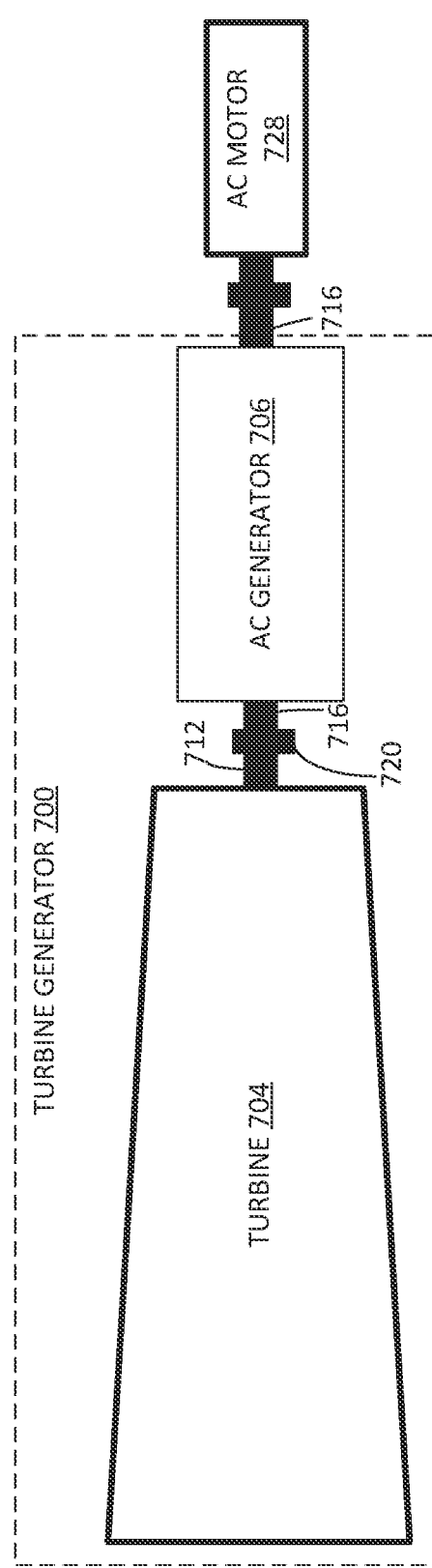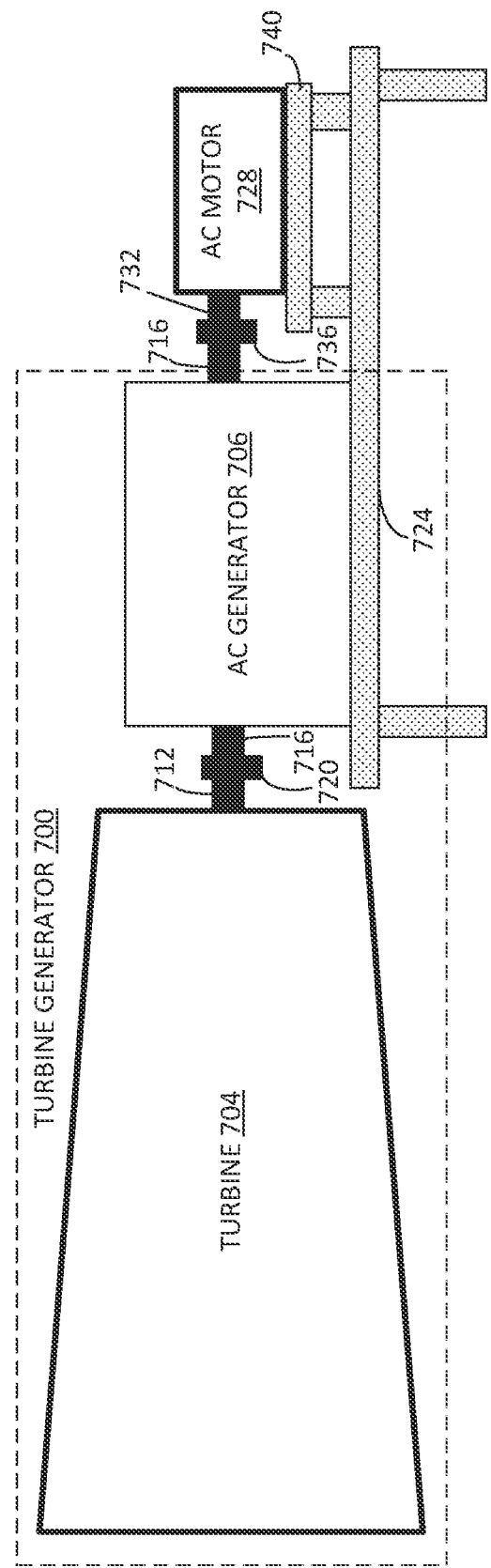
FIG. 7A
FIG. 7B

POWER CAPTURE DURING COAST DOWN OF TURBINE GENERATOR

TECHNICAL FIELD

The present disclosure relates to systems and methods for capturing power provided by a turbine generator during a coast down cycle.

BACKGROUND

A combustion turbine generator, or more simply, a combustion turbine, is a power generation system merging a combustion turbine and an electrical generator to efficiently produce electricity. The combustion of a fuel-air mixture in a combustor, creates high-temperature, high-pressure gases. These gases subsequently traverse a turbine, where their expansion propels the turbine's rotation, converting kinetic energy into mechanical energy. The mechanical energy transfers to an electrical generator, inducing electrical current through electromagnetic induction. The generated electricity is commonly used in power plants for various applications, including responding rapidly to fluctuations in electricity demand.

A coast down cycle of the turbine operations involves a gradual slowing and eventual cessation of a turbine's rotation after the turbine has been running at full speed (e.g., spinning at a full rotational rate). This operation applies to various types of turbines, including combustion turbines. The initiation of the coast down cycle occurs when the energy source propelling the turbine, such as steam, fuel, or wind, is reduced or completely cut off. This controlled shutdown process serves several functions, including ensuring safety, facilitating maintenance activities and maintaining operational control. By allowing the turbine to decelerate gradually, the procedure prevents potential damage to the equipment that abrupt stops could cause.

SUMMARY

A first example is related to a system for generating power that includes a turbine generator for generating alternating current (AC) power and a power electronics module that provides a first signal to switch an operating mode of the turbine generator from an off mode to a startup mode, wherein the first signal is variable frequency power. The system also includes a controller coupled to the turbine generator that provides a second signal that causes the turbine generator to switch from a normal operating mode to a coast down mode. In the startup mode, the turbine generator accelerates from a stop to a full rotational rate to operate in the normal operating mode, in the normal operating mode, the turbine generator rotates at the full rotational rate and provides the AC power to a power grid, and in the coast down mode, the turbine generator decelerates from the full rotational rate to a stop over an interval of time. The system includes a power converter that converts rotational inertia provided by the turbine generator into direct current (DC) power responsive to the turbine generator operating in the coast down mode.

A second example is related to a system for generating power that includes a turbine generator for generating AC power, the turbine generator being coupled to a power grid through a first transformer and a power electronics module coupled to a switchgear power line. The power electronics module switches the turbine generator from an off mode to a startup mode. The system includes a controller that switches the turbine generator from a normal operating mode to a coast down mode. In the startup mode, the turbine generator accelerates from a stop to a full rotational rate to operate in the normal operating mode, in the normal operating mode, the turbine generator rotates at the full rotational rate and provides the AC power to a power grid, and in the coast down mode, the turbine generator decelerates from the full rotational rate to a stop over an interval of time. The power electronics module converts rotational inertia of the turbine generator into DC power responsive to the turbine generator operating in the coast down mode.

A third example is related to a method for generating electrical power. The method includes providing, from a power electronics module, a startup signal to cause the turbine generator to switch from an off mode to a startup mode causing the turbine generator to accelerate from a stop to a full rotational rate in a normal operating mode. The startup signal is variable frequency power. The method also includes ceasing, by the power electronics module, the startup signal, and the turbine generator operates in a normal mode and rotates at the full rotational rate and provides AC power to a power grid. The method includes providing, from a controller, a coast down signal causing the turbine generator to switch from the normal operating mode to a coast down mode, wherein the turbine generator decelerates from the full rotational rate to a stop over an interval of time. The method also includes converting, by a power converter, rotational inertia provided by the turbine generator during the interval of time into DC power.

BRIEF DESCRIPTION OF THE DRAWINGS

FIG. 5A illustrates a top view of an arrangement of a turbine generator and a DC generator.

FIG. 5B illustrates a side view of the arrangement of the turbine generator and the DC generator of FIG. 5A.

FIG. 7A illustrates a top view of an arrangement of a turbine generator and an AC motor.

FIG. 7B illustrates a side view of the arrangement of the turbine generator and the AC motor of FIG. 7A.

DETAILED DESCRIPTION

This description is related to a system for efficient capture of energy generated by a turbine generator during a coast down cycle. The turbine generator can be a combustion turbine generator that consumes fossil fuels. The system includes a power electronics module and a power converter. The power electronics module controls an operating mode of the turbine generator. More particularly, the power electronics module provides three-phase power to switch the operating mode of the turbine generator from an off mode to a startup mode. In the startup mode, the turbine generator accelerates from a stop to a full rotational rate for a startup cycle (e.g., about 8 to about 15 minutes). In a normal operating mode, the turbine generator rotates at the full rotational rate and provides AC (alternating current) power to a power grid. In a coast down mode, the turbine generator decelerates from the full rotational rate to a stop (cessation) over a coast down cycle (e.g., about 28 minutes to about 60 minutes).

The system includes a power converter to convert rotational inertia generated by the turbine generator during the coast down cycle into DC (direct current) power. In some examples, this DC power is stored in a battery bank. In other examples, this DC power is converted into AC power and provided to a switchgear power line.

In some examples, the power electronics module (implementing the power converter) is modified to convert AC power generated during the coast down cycle into DC power, and this DC power is provided to the battery bank. In other examples, the power electronics module (implementing the power converter) is modified to convert the AC power generated during the coast down cycle into DC power, and to convert this DC power into AC power that is provided to the switchgear power line. In still other examples, rather than modifying the power electronics module, a DC generator (implementing the power converter) is coupled to a shaft of the turbine generator, and this DC generator generates DC power stored in the battery bank during the coast down cycle.

In conventional architectures, this rotational inertia provided by a turbine generator during the coast down cycle is simply lost. Thus, for turbine generators, such as combustion turbine generators that may be activated and deactivated within a 24-hour period (e.g., activated for a peak load time), power lost during the coast down cycle can be considerable. Accordingly, the system described herein improves the efficiency of the turbine generator by capturing rotational inertia of the turbine generator during the coast down cycle.

Figure 1:
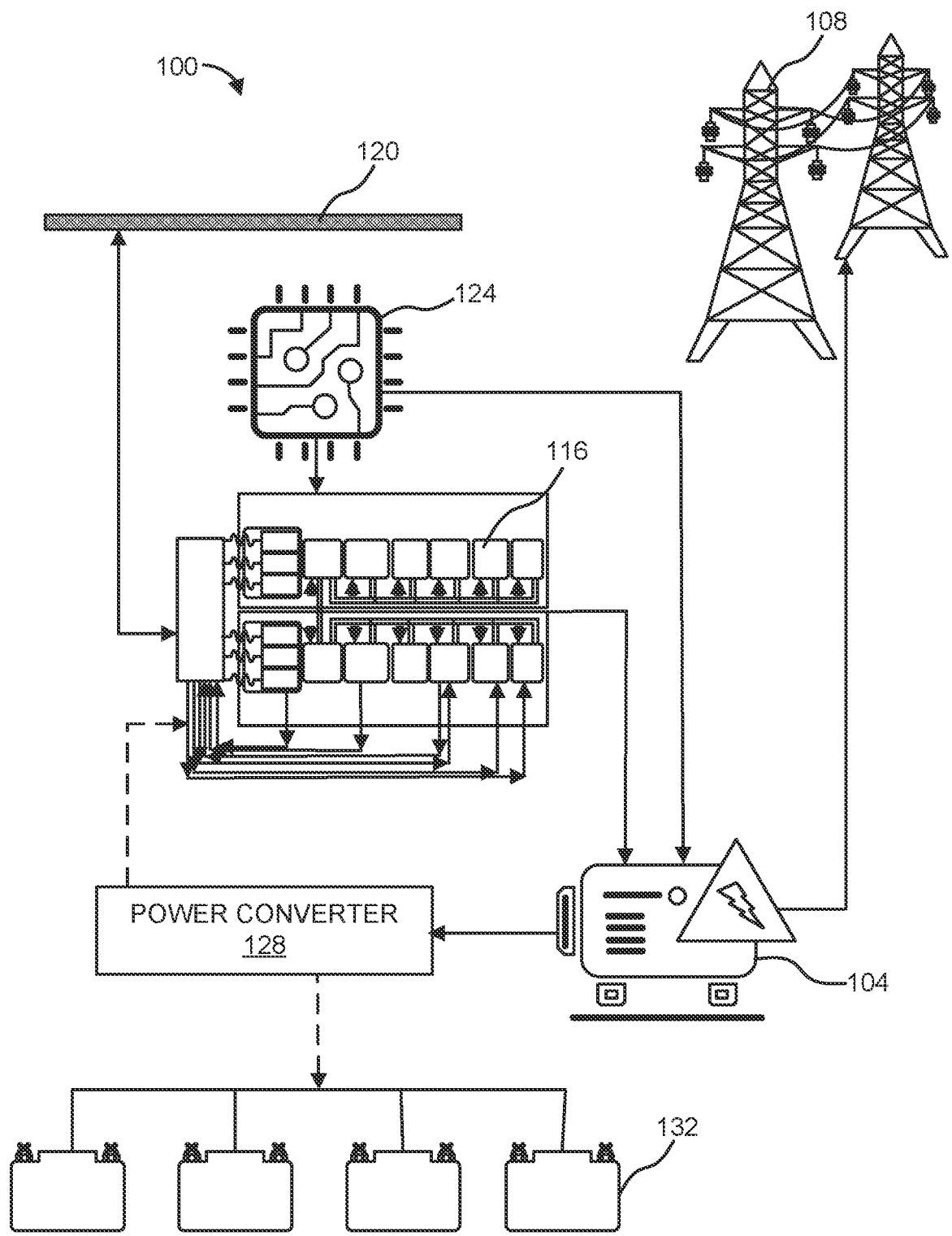
FIG. 1 illustrates a system for capturing power generated by a turbine generator during a coast down cycle.

FIG. 1 illustrates a system 100 for capturing power generated by a turbine generator 104 when the turbine generator 104 is operating in a coast down mode. The turbine generator 104 can be implemented with a combustion turbine generator or a steam turbine generator. The turbine generator 104 is configured to operate in different modes of operation. In an off mode, the turbine generator 104 is stopped, and does not output electrical power. In a startup mode, the turbine generator 104 increases a rotational rate from stopped (0 RPMs (rotations per minute)) to a full rotational rate to about 3600 RPMs over an interval of time that could be from about 8 to about 15 minutes. This interval of time can be referred to as a startup cycle. In a normal operating mode, the turbine generator 104 generates AC (alternating current) power that is provided to a power grid 108. In the normal operating mode, the turbine generator 104 operates at the full rotational rate (e.g., 3600 RPMs). In a coast down mode, the turbine generator 104 decelerates from the full rotational rate to a stop (cessation, e.g., 0 RPM) over an interval of time of about 28 minutes to about 60 minutes (e.g., 30 minutes to 45 minutes in some examples). This interval of time can be referred to as a coast down cycle.

It is noted that the full rotational rate of 3600 RPMs corresponds to a frequency of AC power on the power grid 108 (e.g., 60 hertz (Hz) in North America). In other examples, where the frequency of the power grid 108 is different (e.g., 50 Hz in Europe), the full rotational rate of the turbine generator 104 could be different.

The operating mode of the turbine generator 104 is controlled in part by a power electronics module 116. In some examples, the power electronics module is implemented with an SFC (static frequency converter). The power electronics module 116 is coupled to a switchgear power line 120. Additionally, in some examples, the power electronics module 116 is a VFD (variable frequency drive) that provides three-phase variable frequency power. The switchgear power line 120 provides three-phase power to the power electronics module 116, and the power electronics module 116 outputs three-phase power. In some examples, the power electronics module 116 is controlled by a controller 124. The controller 124 can be implemented as a computing platform, such as a programmable logic controller (PLC) or a processor with embedded instructions. Additionally, in some examples, the controller 124 interfaces with a server, such as a utility server. In each such situation, the controller 124 can provide signals or instructions to the power electronics module 116 and/or the turbine generator 104, and the power electronics module 116 and/or the turbine generator 104 can execute operations in response to the signals or instructions, which in turn can cause the turbine generator 104 to operate in a particular operating mode.

As noted, the turbine generator 104 can be implemented with a combustion turbine generator, such as a turbine generator fueled by the combustion (burning) of fossil fuel (e.g., natural gas). In some such situations, the turbine generator 104 can be switched from the off mode to the startup mode and to the normal operating mode for an interval of time over a day (e.g., during peak load hours of the power grid 108). For example, during a start of a 6-hour peak load time for the power grid 108, the power electronics module 116 can provide a signal (e.g., three-phase power) that causes the turbine generator 104 to switch from the off mode to the startup mode. This signal can be referred to as a startup signal. In the startup mode, the turbine generator 104 consumes fuel and increases a rotational rate from stopped (0 RPMs) to the full rotational rate during the startup cycle. In response to bringing the turbine generator 104 to the full rotational rate, the power electronics module 116 ceases providing the signal, and the turbine generator 104 continues to consume fuel and operates in the normal operating mode until the end of the peak load time. In response to reaching the end of the peak load time, the controller 124 provides instructions and/or a signal which causes the turbine generator 104 to switch to the coast down mode. In some examples, the signal to cause the turbine generator 104 to switch to the coast down mode is provided from the controller 124 to the turbine generator 104. Additionally, to initiate the coast down mode, the fuel supply to the turbine generator 104 can be ceased.

In the coast down mode, the turbine generator 104 decelerates from the full rotational rate to a stop over the coast down cycle (e.g., ranging from about 28 minutes to about 60 minutes). The system 100 includes a power converter 128 that converts rotational inertia provided by the turbine generator 104 into DC (direct current) power responsive to the turbine generator 104 operating in the coast down mode.

The system 100 is configured to capture rotational inertia by the turbine generator 104 during the coast down cycle (e.g., during an interval of time that the turbine generator 104 operates in the coast down mode). Moreover, the rotational inertia provided by the turbine generator 104 could be in the form of AC power or rotational inertia. In each such example, the power converter 128 converts this rotational inertia into DC power. In some such instances, the converted DC power is stored in a battery bank 132 that includes a battery (or multiple batteries operating in concert). In other examples, the DC power is fed back to the power electronics module 116, and the power electronics module 116 converts the DC power into three-phase power (AC power) that matches a frequency of power on the switchgear power line 120 (e.g., 60 Hz or 50 Hz). In still other examples, the power electronics module 116 is provided three-phase power (AC power), and the power electronics module 116 converts this AC power into DC power, which in turn is converted into AC power that matches the frequency of power on the switchgear power line 120 (e.g., 60 Hz or 50 Hz).

More specifically, in a first example (hereinafter, "the first example"), the power electronics module 116 and the power converter 128 are integrated. In the first example, the power electronics module 116 is implemented with an SFC. The power electronics module 116 converts the AC power provided by the turbine generator 104 into DC power during the coast down cycle. During the coast down cycle, the frequency of the AC power decreases from the frequency of the AC power on the power grid 108 (e.g., 60 Hz or 50 Hz) to about 0 Hz (when the stop is reached). However, the power electronics module 116 (integrated with the power converter 128) converts this AC power to the DC power. The DC power is stored in the battery bank 132.

In a second example (hereinafter, "the second example"), the power electronics module 116 and the power converter 128 are also integrated. In the second example, the power electronics module 116 is implemented with an SFC, and the power electronics module 116 converts the AC power provided by the turbine generator 104 during the coast down cycle. During the coast down cycle, the frequency of the AC power decreases from the frequency of the AC power on the power grid 108 (e.g., 60 Hz or 50 Hz) to about 0 Hz (when the stop is reached). However, the power electronics module 116 (integrated with the power converter 128) converts this AC power to the DC power. Additionally, the power electronics module 116 converts the DC power into three-phase power (AC power) that is at the frequency of the three-phase power on the switchgear power line 120 (e.g., 60 Hz or 50 Hz). Accordingly, in some instances of the second example, the battery bank 132 can be omitted.

In a third example (hereinafter, "the third example"), the power converter 128 is implemented as a DC generator with a shaft coupled to (or shared with) a shaft of the turbine generator 104. Thus, during the coast down cycle, the shaft of the turbine generator 104 rotates releasing rotational inertia (e.g., rotational force) from the turbine generator 104, which in turn rotates the shaft of the DC generator (implementing the power converter 128). That is, the shaft of the turbine generator 104 is driven by the rotational inertia of the turbine generator 104 during the coast down cycle. Accordingly, the rotational inertia of the turbine generator 104 during the coast down cycle causes the DC generator to generate DC power. This DC power can be stored at the battery bank 132. Consequently, in the third example, the power converter 128 and the power electronics module 116 are separated components.

In a fourth example (hereinafter, "the fourth example"), the power converter 128 and the power electronics module 116 are integrated. In this situation, the power electronics module 116 is implemented with a VFD, and the power converter 128 includes an AC motor (e.g., a three-phase motor) mechanically coupled to turbine generator 104 through a shaft that may be shared with the turbine generator 104. In this situation, rotation of the AC motor of the power converter 128 causes the turbine generator 104 to rotate. Moreover, in the fourth example, the power electronics module 116 provides the startup signal to the AC motor of the power converter 128 causing the AC motor to rotate, which in turn causes the turbine generator 104 to rotate and accelerate to the full rotational rate during the startup cycle. Further, in the fourth example, responsive to switching to the coast mode, the turbine generator 104 decelerates, causing the rotation of the AC motor of the power converter 128 to decelerate in concert over the coast down cycle. During the coast down cycle, the AC motor operates as an AC generator that generates three-phase power provided to the power electronics module 116. In response, the power electronics module 116 (integrated with the power converter 128 in the fourth example) converts the AC power into DC power, and the power electronics module 116 converts the DC power into three-phase power (AC power) that is at the frequency of the three-phase power on the switchgear power line 120 (e.g., 60 Hz or 50 Hz).

By implementing the system 100, rotational inertia (power) in the form of rotational inertia or AC power during the coast down cycle is captured and reused. In some situations, such as the second example and the fourth example, this captured power is converted to three-phase power and is provided to the switchgear power line 120. In other examples, such as the first example and the third example, this captured power is stored as DC power in the battery bank 132. In any of the first, second, third and fourth examples, energy loss to heat loss is curtailed, thereby improving the overall efficiency of the system 100. More particularly, the carbon footprint per kilowatt generated by the turbine generator 104 is decreased because the total amount of power generated by the turbine generator 104 increases relative to a turbine generator where the power released during the coast down cycle is lost.

Figure 2:
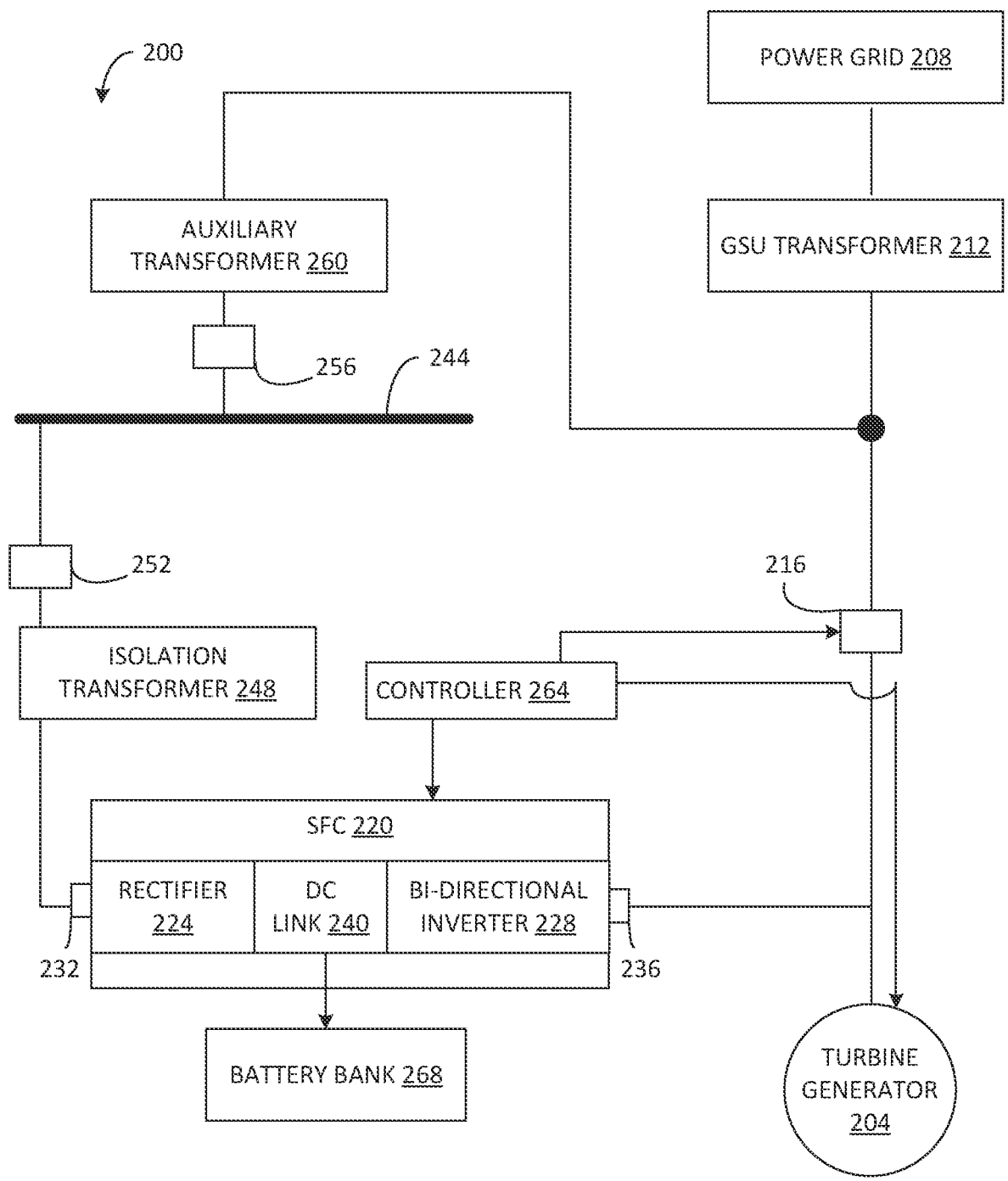
FIG. 2 illustrates a block diagram of a first example system for capturing power generated by a turbine generator during a coast down cycle.

FIG. 2 illustrates a block diagram of a system 200 for capturing power generated by a turbine generator 104 during a coast down cycle. The system 200 is employable to implement the first example of the system 100 of FIG. 1. The system 200 includes a turbine generator 204 that is employable to implement the turbine generator 104 of FIG. 1. Thus, the turbine generator 204 can operate in an off mode, a startup mode, a normal operating mode or a coast down mode. In the off mode, the turbine generator 204 is stationary. In the startup mode, the turbine generator 204 increases a rotational rate from stopped (0 RPMs) to a full rotational rate to about 3600 RPMs over a startup cycle (e.g., 8-15 minutes). In a normal operating mode, the turbine generator 204 generates AC (alternating current) power that is provided to a power grid 208, which is employable to implement the power grid 108 of FIG. 1. In the normal operating mode, the turbine generator 204 operates at the full rotational rate (e.g., 3600 RPMs). In a coast down mode, the turbine generator 204 decelerates from the full rotational rate to a stop (e.g., 0 RPM) over a coast down cycle (e.g., about 28 minutes to about 60 minutes).

The turbine generator 204 is coupled to the power grid 208 through a GSU (generator step up) transformer 212 and a circuit breaker 216. Unless otherwise noted, it is presumed that circuit breakers, including the circuit breaker 216 described in this description are in a closed state allowing electricity to flow unimpeded therethrough. In some examples, the turbine generator 204 generates three-phase AC power with a voltage of about 18-26 kV (kilovolts) RMS (root mean squared) AC. The GSU transformer 212 converts the AC power output by the turbine generator 204 into a gird power voltage, such as about 145-525 kV RMS AC.

The operating state of the turbine generator 204 is controlled in part by an SFC 220. The SFC 220 is employable to implement the power electronics module 116 of FIG. 1. The SFC 220 is implemented as a VFD. The SFC 220 can include a rectifier 224 and a bi-directional inverter 228. The rectifier 224 can convert three-phase AC power provided at an input 232 of the SFC 220 into DC power. Additionally, the bi-directional inverter 228 can convert DC power provided by the rectifier 224 into variable frequency three-phase power (e.g., a startup signal) that is provided on an output 236 of the SFC 220. The rectifier 224 and the bi-directional inverter 228 are coupled through a DC link 240.

The DC link 240 provides an intermediary component in the power conversion process. The DC link temporarily stores the converted DC power with a capacitor or a reactor (e.g., an inductor). This stored energy is employed for smoothing voltage fluctuations and ensuring a steady DC voltage supply to the bi-directional inverter 228. In the subsequent DC to AC conversion by the bi-directional inverter 228, the DC link 240 enables the generation of a stable AC output voltage with a desired frequency. Additionally, the DC link 240 allows control of the output voltage and frequency by facilitating voltage level adjustments and power flow regulation between the DC link 240 and the bi-directional inverter 228, contributing to an overall efficiency and performance of the SFC 220.

The SFC 220 is provided the AC power from a switchgear power line 244, which is implemented with a three-phase power line. More particularly, the input 232 is coupled to an isolation transformer 248 that is coupled to a circuit breaker 252. The switchgear power line 244 is powered by the power grid 208 through the GSU transformer 212. More particularly, the switchgear power line 244 is coupled to a circuit breaker 256 and to an auxiliary transformer 260. In some examples, the switchgear power line 244 has a voltage of about 4.16 kV RMS AC, such that the auxiliary transformer 260 is a step-down transformer from the voltage at the GSU transformer 212 (e.g., 18-26 kV RMS AC) to the 4.16 kV RMS AC. Additionally, the input 232 of the SFC 220 receives a three-phase input voltage of about 2 kV RMS AC, such that the isolation transformer 248 is a step-down transformer from the voltage of the switchgear power line 244 of about 4.16 kV RMS AC to about 2 kV RMS AC.

The SFC 220 can be controlled with a controller 264. Additionally, a state (open state or closed state) of the circuit breaker 216 is also controllable with the controller 264. The controller 264 can be implemented with the controller 124 of FIG. 1. Thus, the controller 264 provides instructions or signals to the SFC 220 and/or the turbine generator 204 and the SFC 220 and/or the turbine generator 204 executes operations in response to the instructions or signals. More particularly, the controller 264 can provide instructions to the SFC 220 that cause the SFC 220 switch the operating mode of the turbine generator 204 from the off mode to the startup mode. In response to these instructions, the SFC 220 provides a signal (e.g., variable frequency three-phase power) to the turbine generator 204 to switch the operating mode of the turbine generator 204 from the off mode to the startup mode.

In some examples, the turbine generator 204 is a combustion turbine generator that consumes fossil fuel (e.g., natural gas). In such an example, the turbine generator 204 is frequently used on an intermittent basis to add power to the power grid 208 during peak load times. Moreover, in such examples, the turbine generator 204 operates in the off mode during non-peak load times. In such an example the controller 264 is programmed to change the operating mode of the turbine generator 204 prior to the peak load time.

For example, suppose that a peak load time begins at 14:00 (2:00 p.m.), and the turbine generator 204 has a startup cycle of 15 minutes. In such a situation the controller 264 can be programmed to provide instructions to cause the SFC 220 to switch to the startup mode at 13:45 (1:45 p.m.). In response, the SFC 220 provides the variable frequency three-phase power to the turbine generator 204 to cause the turbine generator 204 to switch operating modes from the off mode to the startup mode. In the startup mode, the turbine generator 204 consumes fuel to accelerate the rotation of the turbine generator 204. Thus, at the start of the peak load time, namely 14:00 (2:00 p.m.) in the provided example, the turbine generator 204 has reached the full rotational rate (e.g., 3600 RPMs). In response, the controller 264 instructs the SFC 220 to cease the startup signal (variable frequency three-phase power), and the turbine generator 204 operates in the normal mode. In the normal operating mode, the turbine generator 204 provides a voltage of about 18-25 kV RMS AC to the GSU transformer 212, which in turn provides the AC power to the power grid 208.

At the end of the peak load time, the controller 264 provides instructions to the turbine generator 204 to cease generating AC power, such that the turbine generator 204 switches to the coast down mode, and the turbine generator 204 decelerates from the full rotational rate (e.g., 3600 RPMs) a stop over the coast down cycle. Further, to switch to the coast down mode, the fuel supply to the turbine generator 204 is ceased. Additionally, the controller 264 changes the state of the circuit breaker 216 from the closed state to the open state to galvanically isolate the turbine generator 204 from the GSU transformer 212.

As noted, the system 200 implements the first example. Thus, in the system 200, the SFC 220 includes the features of the power converter 128 of FIG. 1. That is, the SFC 220 represents an integration of the power electronics module 116 and the power converter 128 of FIG. 1. More particularly, as noted, the SFC 220 include the bi-directional inverter 228. The bi-directional inverter 228 can convert electrical energy in two directions: from DC power to AC power and AC power to DC power. During the startup cycle, the bi-directional inverter 228 converts DC power (provided from the rectifier 224 through the DC link 240) to AC power. In response to instructions from the controller 264 to cause the turbine generator 204 to operate in the startup mode, the bi-directional inverter 228 converts DC power (from the DC link 240) into AC power. In response to instructions from the controller 264 to cause the turbine generator 204 to operate in the coast down mode, the bi-directional inverter 228 is provided three-phase AC power at the output 236 of the SFC 220 because the circuit breaker 216 is opened during the coast down cycle. The bi-directional inverter 228 converts this three-phase AC power into DC power. This converted DC power is provided to a battery bank 268 that stores the DC power for later consumption. The battery bank 268 is employable to implement the battery bank 132 of FIG. 1.

During the coast down cycle, the frequency of the AC power provided by the turbine generator 204 decreases as the rotational rate of the turbine generator 204 also decreases. However, the bi-directional inverter 228 can still convert this AC power into to DC power.

Thus, by employing the system 200, during the coast down cycle, which can last from about 28 minutes to about 60 minutes, the AC power output by the turbine generator 204 is captured and stored for later use. In this manner, power that would be lost in a conventional architecture is stored, thereby increasing an overall efficiency of the system 200.

Figure 3:
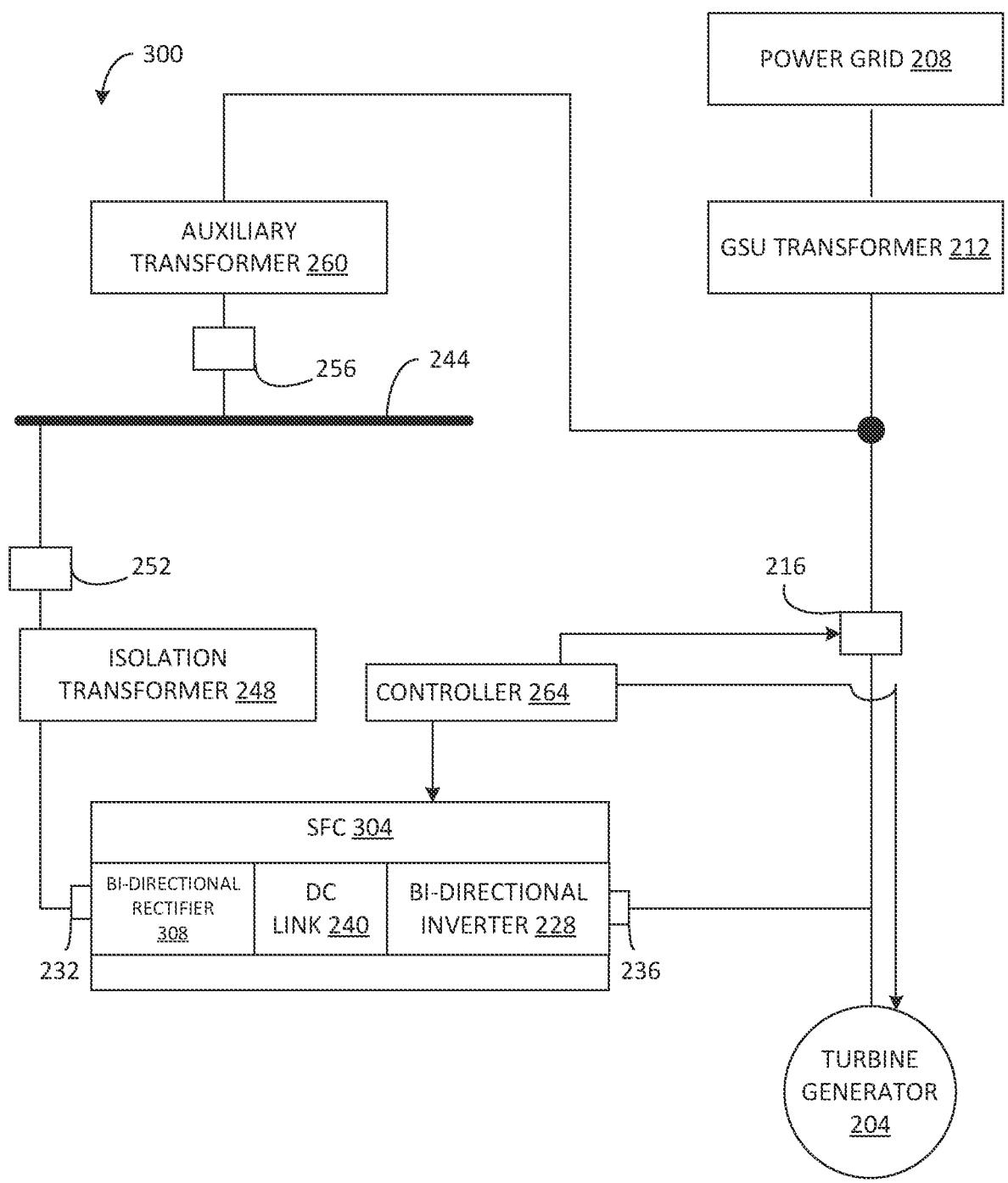
FIG. 3 illustrates a block diagram of a second example for capturing power generated by a turbine generator during a coast down cycle.

FIG. 3 illustrates a block diagram of a system 300 for capturing power generated by a turbine generator 104 during a coast down cycle. The system 300 is employable to implement the second example of the system 100 of FIG. 1. For brevity, the same reference numbers are employed in FIGS. 2 and 3 to denote the same structure. Moreover, some features of FIG. 2 are not reintroduced.

The system 300 is similar to the system 200 of FIG. 2, except that an SFC 304 includes a bi-directional rectifier 308, and the system 300 does not need a battery bank (e.g., the battery bank 268 is omitted). The SFC 304 includes the bi-directional rectifier 308, the DC link 240 and the bi-directional inverter 228. Additionally, the turbine generator 204 operates in the off mode, the startup mode, the normal operating mode and the coast down mode.

As noted, the system 300 implements the second example. Thus, in the system 300, the SFC 304 includes the features of the power converter 128 of FIG. 1. That is, the SFC 304 represents an integration of the power electronics module 116 and the power converter 128 of FIG. 1. More particularly, as noted, the SFC includes a bi-directional rectifier 308 and the bi-directional inverter 228. Similar to the bi-directional inverter 228, the bi-directional rectifier 308 converts electrical energy in two directions: from DC power to AC power and AC power to DC power. During the startup cycle, the bi-directional rectifier 308 converts three-phase AC power provided at the input 232 into DC power, and the bi-directional inverter 228 converts the DC power (provided from the rectifier 224 through the DC link 240) to variable frequency three-phase power. Thus, in response to instructions from the controller 264 to cause the turbine generator 204 to operate in the startup mode, the bi-directional rectifier 308 converts the three-phase AC power into DC power, and the bi-directional inverter 228 converts the DC power (from the DC link 240) into the variable frequency three-phase power. In response to instructions from the controller 264 to cause the turbine generator 204 to operate in the coast down mode, the bi-directional inverter 228 converts three-phase AC power provided at the output 236 of the SFC 220 into DC power. This three-phase AC power is provided to the output 236 of the SFC 220 because the circuit breaker 216 is opened during the coast down cycle. Additionally, the bi-directional rectifier 308 receives this DC power through the DC link 240 and converts this DC power into three-phase AC power that has a frequency of power on the switchgear power line 244 (e.g., 60 Hz or 50 Hz). This three-phase AC power is provided at the input 232 and is transmitted through the isolation transformer 248 and the circuit breaker 252 for usage on the switchgear power line 244.

As the turbine generator 204 decelerates in the coast down mode, a frequency of the AC power provided to the output 236 of the SFC 304 also decreases. However, the bi-directional inverter 228, the DC link 240 and the bi-directional rectifier 308 of the SFC 304 operate in concert to provide a relatively smooth three-phase power (AC power) at a selected frequency (60 Hz or 50 Hz) on the switchgear power line 244.

By employing the system 300, power that would normally be lost in a conventional architecture is consumed on the switchgear power line 244. Thus, the system 300 improves the overall efficiency of the turbine generator 204.

Figure 4:
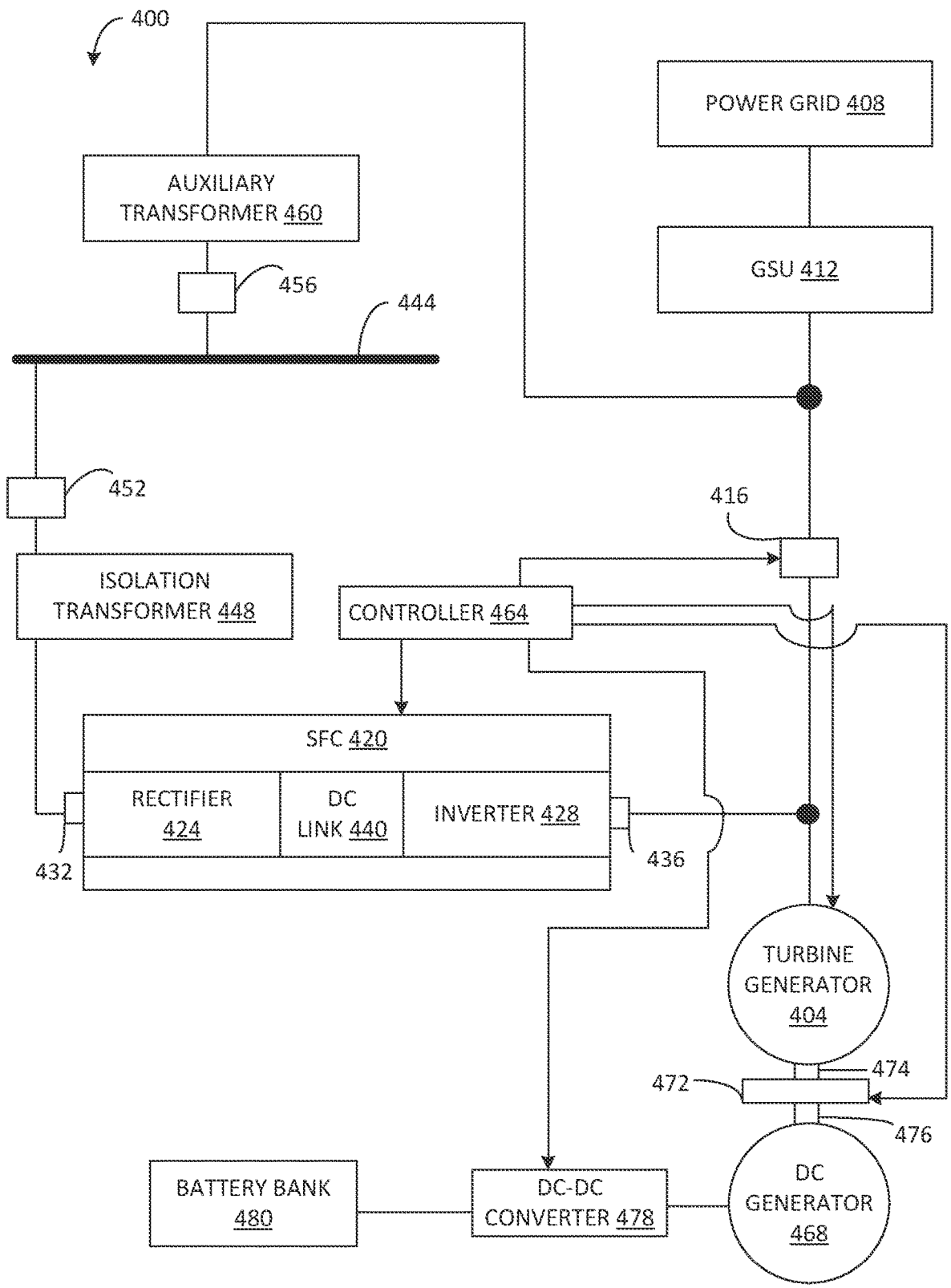
FIG. 4 illustrates a block diagram of a third example system for capturing power generated by a turbine generator during a coast down cycle.

FIG. 4 illustrates a block diagram of a system 400 for capturing power generated by a turbine generator 104 during a coast down cycle. The system 400 is employable to implement the third example of the system 100 of FIG. 1. The system 400 includes a turbine generator 404 that is employable to implement the turbine generator 104 of FIG. 1. Thus, the turbine generator 404 can operate in an off mode, a startup operating mode, a normal operating mode or a coast down mode. In the off mode, the turbine generator 404 is stationary. In the startup mode, the turbine generator 404 increases a rotational rate from stopped (0 RPMs) to a full rotational rate to about 3600 RPMs over a startup cycle (e.g., 8-15 minutes). In a normal operating mode, the turbine generator 404 generates three-phase AC power that is provided to a power grid 408, which is employable to implement the power grid 108 of FIG. 1. In the normal operating mode, the turbine generator 404 operates at the full rotational rate (e.g., 3600 RPMs). In a coast down mode, the turbine generator 404 decelerates from the full rotational rate to a stop (e.g., 0 RPM) over the coast down cycle (e.g., about 28 minutes to about 60 minutes).

The turbine generator 404 is coupled to the power grid 408 through a GSU transformer 412 and a circuit breaker 416. In some examples, the turbine generator 404 generates three-phase AC power with a voltage of about 18-26 kV RMS AC. The GSU transformer 412 converts the AC power output by the turbine generator 404 into a grid power voltage, such as about 145-525 kV RMS AC (a three-phase power).

The operating mode of the turbine generator 404 can be switched from the off mode to the startup mode by an SFC 420. The SFC 420 is employable to implement the power electronics module 116 of FIG. 1. The SFC 420 is implemented as a VFD. The SFC 420 can include a rectifier 424 and an inverter 428. The rectifier 424 can convert AC power provided at an input 432 of the SFC 420 into DC power. Additionally, the inverter 428 can convert DC power provided by the rectifier 424 into AC power (e.g., variable frequency three-phase power) that is provided on an output 436 of the SFC 420. The rectifier 424 and the inverter 428 are coupled through a DC link 440. The DC link 440 provides an intermediary component in the power conversion process. The DC link 440 can be implemented with the DC link 240 of FIGS. 2 and 3.

The SFC 420 is provided three-phase AC power from a switchgear power line 444. More particularly, the input 432 is coupled to an isolation transformer 448 that is coupled to a circuit breaker 452. The switchgear power line 444 is powered by the power grid 408 through the GSU transformer 412. More particularly, the switchgear power line 444 is coupled to a circuit breaker 456 and to an auxiliary transformer 460. In some examples, the switchgear power line 444 has a voltage of about 4.16 kV RMS AC, such that the auxiliary transformer 460 is a step-down transformer from the voltage at the GSU transformer 412 (e.g., 18-26 kV RMS AC) to the 4.16 kV RMS AC. Additionally, the input 432 of the SFC 420 receives an input voltage of about 4 kV RMS AC, such that the isolation transformer 448 is a step-down transformer from the voltage of the switchgear power line 444 of about 4.16 kV RMS AC to about 4 kV RMS AC.

The SFC 420 can be controlled with a controller 464. Additionally, a state (open state or closed state) of the circuit breaker 416 is also controllable with the controller 464. The controller 464 can be implemented with the controller 124 of FIG. 1. Thus, the controller 464 provides instructions or signals to the SFC 420 and/or the turbine generator 404, and the SFC 420 and/or the turbine generator 404 executes operations in response to the instructions or signals. More particularly, the controller 464 can provide instructions to the SFC 420 that cause the SFC 420 to change the operating mode of the turbine generator 404 from the off mode to the startup mode. In response to these instructions, the SFC 420 provides a signal (e.g., the variable frequency three-phase power) to the turbine generator 404 to cause the turbine generator 404 to switch from the off mode to the startup mode.

In some examples, the turbine generator 404 is a combustion turbine generator that consume fossil fuel (e.g., natural gas). In such an example, the turbine generator 404 is frequently used on an intermittent basis to add power to the power grid 408 during peak load times. Moreover, in such examples, the turbine generator 404 operates in the off mode during non-peak load times. In such an example the controller 464 is programmed to change the operating mode of the turbine generator 404 prior to the peak load time.

For example, suppose that the peak load time begins at 16:00 (4:00 p.m.), and the turbine generator 404 has a startup cycle of 10 minutes. In such a situation the controller 464 can be programmed to provide instructions to cause the SFC 420 to switch to the startup mode at 15:50 (3:50 p.m.). In response, the SFC 420 provides the variable frequency three-phase power to the turbine generator 404 to cause the turbine generator 404 to switch operating modes from the off mode to the startup mode. Thus, at the start of the peak load time, namely 16:00 (4:00 p.m.) in the provided example, the turbine generator 404 has reached the full rotational rate (e.g., 3600 RPMs). In response, the controller 464 instructs the SFC 420 to cease providing the variable frequency three-phase power, and the turbine generator 404 operates in the normal operating mode. In the normal operating mode, the turbine generator 404 consumes fuel and provides a three-phase power of about 18-25 kV RMS AC to the GSU transformer 412, which in turn provides the AC power to the power grid 408.

At the end of the peak load time, the controller 464 provides instructions to the turbine generator 404 to cease generating the three-phase power (e.g., provide instructions to cause the turbine generator 404 to switch to the coast down mode), such that the turbine generator 404 switches to the coast down mode, and the turbine generator 404 decelerates from the full rotational rate (e.g., 3600 RPMs) to a stop over the coast down cycle in response. Additionally, the fuel supply to the turbine generator 404 is ceased to initiate the coast down cycle. Also, the controller 464 changes the state of the circuit breaker 416 from the closed state to the open state to galvanically isolate the turbine generator 404 from the GSU transformer 412.

As noted, the system 400 implements the third example. Accordingly, the system 400 includes a DC generator 468 that is employable to implement the power converter 128 of FIG. 1. The DC generator 468 is coupled to the turbine generator 404 through a coupling 472. More particularly, a shaft 474 (e.g., generator shaft) of the DC generator 468 is coupled to a shaft 476 (e.g., generator shaft) of the turbine generator 404. The shaft 474 is driven by the turbine generator 404.

In some examples, a state of the coupling 472 is controllable with the controller 464. In an activated state, the coupling 472 grips the shaft 474 of the turbine generator 404 and the shaft 476 of the DC generator 468, such that rotation of the shaft 474 forces rotation of the shaft 476, causing the DC generator 468 to generate DC power. In a deactivated state, the coupling 472 allows the shaft 474 of the turbine generator 404 to rotate without inducing rotation of the shaft 476 of the DC generator 468. In other examples, the coupling 472 permanently mechanically couples the shaft 474 of the turbine generator 404 and the shaft 476 of the DC generator 468.

FIG. 5A illustrates a top view of an arrangement of a turbine generator 500 that includes a turbine 504 and an AC generator 506. The turbine generator 500 is employable to implement the turbine generator 104 of FIG. 1 and/or the turbine generator 404 of FIG. 4. FIG. 5B illustrates a side view of the turbine generator 500. Thus, FIGS. 5A and 5B employ the same reference numbers to denote the same structure.

In the example illustrated, it is presumed that the turbine 504 is a combustion turbine that drives a shaft 512. However, in other examples, other types of turbines are employable. The shaft 512 of the turbine 504 is coupled with a shaft 516 of the AC generator 506 with a coupling 520. The AC generator 506 is mounted on a first platform 524 that is employed to bring the shaft 516 of the AC generator 506 in alignment with the shaft 512 of the turbine 504.

The turbine generator 500 is coupled to a DC generator 528. The DC generator 468 is employable to implement the turbine generator 404 and/or the power converter 128 of FIG. 1. More particularly, the shaft 516 of the AC generator 506 is coupled with a shaft 532 of the DC generator 528 through a coupling 536. The DC generator 528 is mounted on a second platform 540. The second platform 540 is sized to bring the shaft 532 of the DC generator 528 in alignment with the shaft 516 of the AC generator 506. In other examples, the first platform 524 and/or the second platform 540 are omitted. In some examples, a state of the coupling 536 is controllable. In an activated state the coupling 536 applies a grip on the shaft 516 of the AC generator 506 and the shaft 532 of the DC generator 528, such that rotation of the shaft 516 of the AC generator 506 induces rotation of the shaft 532 of the DC generator 528, which causes the DC generator 528 to generate DC power. In a deactivated state, the coupling 536 allows the shaft 516 to rotate without rotating the shaft 532 of the DC generator 528. In other examples, the coupling 536 permanently mechanically couples the shaft 516 of the AC generator 506 and the shaft 532 of the DC generator 528.

Referring back to FIG. 4, in response to instructions from the controller 464 to cause the turbine generator 404 to operate in the startup mode, the inverter 428 converts DC power (from the DC link 440) into AC power. Additionally, in some examples, in the startup mode, the controller 464 causes the circuit breaker 416 to be in the closed state and sets the coupling 472 to be in the deactivated state. In response to the turbine generator 404 reaching the full rotational rate, the inverter 428 ceases the variable frequency three-phase power provided at the output 436, and the turbine generator 404 operates in the normal operating mode.

In response to instructions and/or a signal from the controller 464 to cause the turbine generator 404 to operate in the coast down mode the turbine generator 404 ceases providing the AC power to the power grid 408. Also, to initiate the coast down mode, the fuel supply to the turbine generator 404 is ceased. In the coast down mode, the controller 464 changes a state of the circuit breaker 416 to the open state and changes a state of the coupling 472 to the activated state. Thus, during the coast down cycle, the shaft 474 of the turbine generator 404 rotates, inducing rotation of the shaft 476 of the DC generator 468, which in turn causes the DC generator 468 to generate DC power. That is, the DC generator 468 converts rotational inertia provided by the turbine generator 404 into DC power. The DC generator 468 is coupled to a DC-DC converter 478, which in turn is coupled to a battery bank 480. The battery bank 480 is employable to implement the battery bank 132 of FIG. 1. The DC-DC converter 478 adjusts a voltage of the DC power output by the DC generator 468 to a voltage level needed to charge batteries of the battery bank 480. The DC-DC converter 478 is controlled by the controller 464. More particularly, to initiate the coast down mode, the controller 464 activates the DC-DC converter 478 to initiate charging of the batteries of the 480, which also increase torque on the DC generator 468. The battery bank 480 stores the DC power generated by the DC generator 468 during the coast down cycle (e.g., about 28 minutes to about 60 minutes) that is adjusted with the DC-DC converter 478.

Thus, by employing the system 400, during the coast down cycle, which can last from about 28 minutes to about 60 minutes, rotational inertia (power) provided by the turbine generator 404 is converted into DC power by the DC generator 468 and captured and stored for later use by the battery bank 480. In this manner, power that would be lost in a conventional architecture is stored, thereby increasing an overall efficiency of the system 400.

Figure 6:
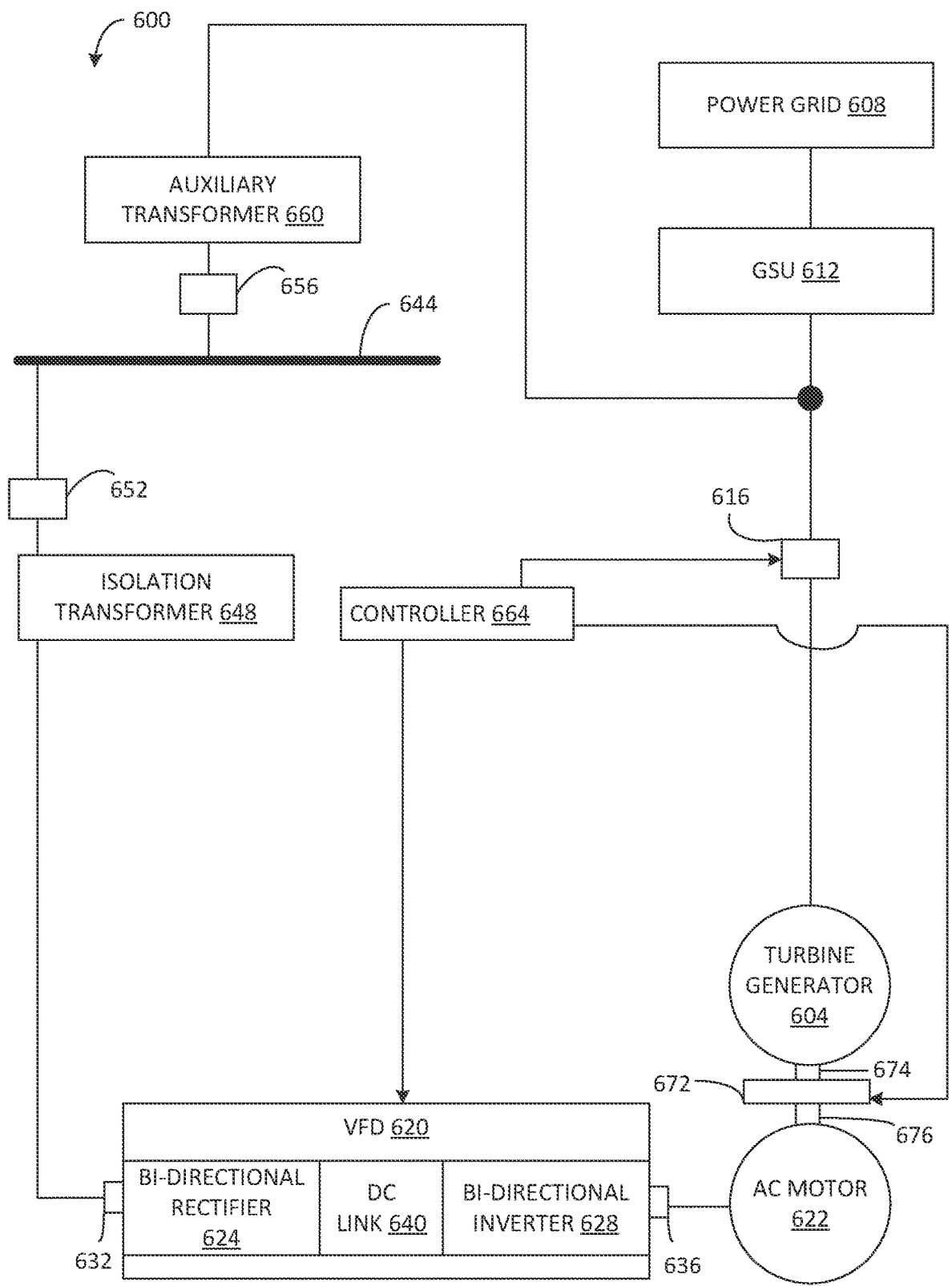
FIG. 6 illustrates a block diagram of a fourth example system for capturing power generated by a turbine generator during a coast down cycle.

FIG. 6 illustrates a block diagram of a system 600 for capturing power generated by a turbine generator 104 during a coast down cycle. The system 600 is employable to implement the fourth example of the system 100 of FIG. 1. The system 600 includes a turbine generator 604 that is employable to implement the turbine generator 104 of FIG. 1. Thus, the turbine generator 604 can operate in an off mode, a startup operating mode, a normal operating mode or a coast down mode. In the off mode, the turbine generator 604 is stationary. In the startup mode, the turbine generator 604 increases a rotational rate from stopped (0 RPMs) to a full rotational rate to about 3600 RPMs over a startup cycle (e.g., 8-15 minutes). In a normal operating mode, the turbine generator 604 generates three-phase AC power that is provided to a power grid 608, which is employable to implement the power grid 108 of FIG. 1. In the normal operating mode, the turbine generator 604 operates at the full rotational rate (e.g., 3600 RPMs). In a coast down mode, the turbine generator 604 decelerates from the full rotational rate to a stop (e.g., 0 RPM) over the coast down cycle (e.g., about 28 minutes to about 60 minutes).

The turbine generator 604 is coupled to the power grid 608 through a GSU transformer 612 and a circuit breaker 616. In some examples, the turbine generator 604 generates three-phase AC power with a voltage of about 18-26 kV RMS AC. The GSU transformer 612 converts the AC power output by the turbine generator 604 into a grid power voltage, such as about 145-525 kV RMS AC (a three-phase power).

The operating mode of the turbine generator 604 can be switched from the off mode to the startup mode by a VFD 620 operating in concert with an AC motor 622. The VFD 620 is employable to implement the power electronics module 116 of FIG. 1, and the AC motor 622 is employable to implement a component of the power converter 128 of FIG. 1. Additionally, in the system 600, the VFD 620 includes the features of the power converter 128 of FIG. 1. That is, the VFD 620 represents an integration of the power electronics module 116 and the power converter 128 of FIG. 1. The VFD 620 includes a bi-directional rectifier 624 and the bi-directional inverter 628. The bi-directional rectifier 624 can convert AC power provided at an input 632 of the VFD 620 into DC power. Additionally, the bi-directional inverter 628 can convert DC power provided by the bi-directional rectifier 624 into AC power (e.g., variable frequency three-phase power) that is provided on an output 636 of the VFD 620. The bi-directional rectifier 624 and the bi-directional inverter 628 are coupled through a DC link 640. The DC link 640 provides an intermediary component in the power conversion process. The DC link 640 can be implemented similar to the DC link 240 of FIGS. 2 and 3.

The bi-directional rectifier 624 converts electrical energy in two directions: from AC power to DC power and DC power to AC power. Additionally, similar to the bi-directional inverter 628, the bi-directional rectifier 624 converts electrical energy in two directions: from DC power to AC power and AC power to DC power. The VFD 620 is provided three-phase AC power from a switchgear power line 644. More particularly, the input 632 is coupled to an isolation transformer 648 that is coupled to a circuit breaker 652. The switchgear power line 644 is powered by the power grid 608 through the GSU transformer 612. More particularly, the switchgear power line 644 is coupled to a circuit breaker 656 and to an auxiliary transformer 660. In some examples, the switchgear power line 644 has a voltage of about 6.16 kV RMS AC, such that the auxiliary transformer 660 is a step-down transformer from the voltage at the GSU transformer 612 (e.g., 18-26 kV RMS AC) to the 6.16 kV RMS AC. Additionally, the input 632 of the VFD 620 receives an input voltage of about 6 kV RMS AC, such that the isolation transformer 648 is a step-down transformer from the voltage of the switchgear power line 644 of about 6.16 kV RMS AC to about 6 kV RMS AC.

The VFD 620 can be controlled with a controller 664. Additionally, a state (open state or closed state) of the circuit breaker 616 is also controllable with the controller 664. The controller 664 can be implemented with the controller 124 of FIG. 1. Thus, the controller 664 provides instructions or signals to the VFD 620, and the VFD 620 executes operations in response to the instructions or signals. As noted, the system 600 implements the fourth example. Accordingly, the AC motor 622 is coupled to the turbine generator 604 through a coupling 672. More particularly, a shaft 674 (e.g., motor shaft) of the AC motor 622 is coupled to a shaft 676 (e.g., generator shaft) of the turbine generator 604. The shaft 674 is driven by the turbine generator 604.

During the startup cycle, the bi-directional rectifier 624 converts three-phase AC power provided at the input 632 into DC power, and the bi-directional inverter 628 converts the DC power (provided from the bi-directional rectifier 624 through the DC link 640) to variable frequency three-phase power that is provided to the AC motor 622. Responsive to the variable frequency three-phase power, the AC motor 622 rotates. Because of the coupling 672 between the shaft 676 of the AC motor 622 and the shaft 674 of the turbine generator 604, rotation of the AC motor 622 induces rotation of the turbine generator 604. The AC motor 622 accelerates from a stop to the full rotational rate (e.g., 3600 RPMs), which causes the turbine generator 604 to rotate in concert with the AC motor 622. In this manner, instructions from the controller 664 can cause the turbine generator 604 to switch operating modes from the off mode to the startup mode.

In some examples, the turbine generator 604 is a combustion turbine generator that consume fossil fuel (e.g., natural gas). In such an example, the turbine generator 604 is frequently used on an intermittent basis to add power to the power grid 608 during peak load times. Moreover, in such examples, the turbine generator 604 operates in the off mode during non-peak load times. In such an example the controller 664 is programmed to change the operating mode of the turbine generator 604 prior to the peak load time.

For example, suppose that the peak load time begins at 16:00 (4:00 p.m.), and the turbine generator 604 has a startup cycle of 10 minutes (the same as the third example). In such a situation the controller 664 can be programmed to provide instructions to cause the VFD 620 to switch to the startup mode at 15:50 (3:50 p.m.). In response, the VFD 620 provides the variable frequency three-phase power to the AC motor 622 to cause the AC motor 622 to rotate. Rotation of the AC motor 622 causes the rotation of the turbine generator 604 through the shaft 676 and the shaft 674 to switch operating modes from the off mode to the startup mode. This rotation of the AC motor 622 and the turbine generator 604 accelerates from stopped to the full rotational rate (e.g., 3600 RPMs).

Thus, at the start of the peak load time, namely 16:00 (4:00 p.m.) in the provided example, the turbine generator 604 has reached the full rotational rate (e.g., 3600 RPMs). In response, the controller 664 instructs the VFD 620 to cease providing the variable frequency three-phase power to the AC motor 622, and the turbine generator 604 operates in the normal operating mode. In the normal operating mode, the turbine generator 604 consumes fuel and provides a three-phase power of about 18-25 kV RMS AC to the GSU transformer 612, which in turn provides the AC power to the power grid 608.

At the end of the peak load time, the controller 664 can change the state of the circuit breaker 616 from the closed state to the open state to galvanically isolate the turbine generator 604 from the GSU transformer 612. Additionally, the fuel supply to the turbine generator 604 is ceased, and the turbine generator 604 initiates the coast down cycle. In the coast down cycle the turbine generator 604 decelerates from the full rotational rate (e.g., 3600 RPMs) to a stop over the coast down cycle in response. Correspondingly, the AC motor 622 also decelerates from the full rotational rate (e.g., 3600 RPMs) to a stop over the coast down cycle.

In some examples, a state of the coupling 672 is controllable with the controller 664. In an activated state, the coupling 672 grips the shaft 674 of the turbine generator 604 and the shaft 676 of the AC motor 622, such that rotation of the shaft 674 forces rotation of the shaft 676, causing the AC motor 622 and the turbine generator 604 to rotate in concert. In a deactivated state, the coupling 672 allows the shaft 674 of the turbine generator 604 to rotate without inducing rotation of the shaft 676 of the AC motor 622 or vice versa. In other examples, the coupling 672 permanently mechanically couples the shaft 674 of the turbine generator 604 and the shaft 676 of the AC motor 622.

FIG. 7A illustrates a top view of an arrangement of a turbine generator 700 that includes a turbine 704 and an AC generator 706. The turbine generator 700 is employable to implement the turbine generator 104 of FIG. 1 and/or the turbine generator 604 of FIG. 6. FIG. 7B illustrates a side view of the turbine generator 700. Thus, FIGS. 7A and 7B employ the same reference numbers to denote the same structure.

In the example illustrated, it is presumed that the turbine 704 is a combustion turbine that drives a shaft 712. However, in other examples, other types of turbines are employable. The shaft 712 of the turbine 704 is coupled with a shaft 716 of the AC generator 706 with a coupling 720. The AC generator 706 is mounted on a first platform 724 that is employed to bring the shaft 716 of the AC generator 706 in alignment with the shaft 712 of the turbine 704.

The turbine generator 700 is coupled to an AC motor 728. The AC motor 728 is employable to implement the AC motor 622 of FIG. 6 and/or the power converter 128 of FIG. 1. More particularly, the shaft 716 of the AC generator 706 is coupled with a shaft 732 of the AC motor 728 through a coupling 736. The AC motor 728 is mounted on a second platform 740. The second platform 740 is sized to bring the shaft 732 of the AC motor 728 in alignment with the shaft 716 of the AC generator 706. In other examples, the first platform 724 and/or the second platform 740 are omitted. In some examples, a state of the coupling 736 is controllable. In an activated state the coupling 736 applies a grip on the shaft 716 of the AC generator 706 and the shaft 732 of the AC motor 728, such that rotation of the shaft 716 of the AC motor 728 induces rotation of the shaft 732, which causes the AC generator 706 to rotate. Similarly, rotation of the shaft 716 induces rotation of the shaft 732 which causes the AC motor 728 to generate AC power. In a deactivated state, the coupling 736 allows the shaft 716 to rotate without rotating the shaft 732 of the AC motor 728 and vice versa. In other examples, the coupling 736 permanently mechanically couples the shaft 716 of the AC generator 706 and the shaft 732 of the AC motor 728.

Referring back to FIG. 6, as noted, in response to instructions from the controller 664 to cause the turbine generator 604 to operate in the startup mode, the inverter 628 converts DC power (from the DC link 640) into AC power, which AC power is provided to the AC motor 622. Additionally, in some examples, in the startup mode, the controller 664 causes the circuit breaker 616 to be in the closed state and sets the coupling 672 to be in the activated state, such that the AC motor 622 and the turbine generator 622 accelerate from a stop to the full rotational rate (e.g., 3600 RPMs). In response to the AC motor 622 (and the turbine generator 604) reaching the full rotational rate, the inverter 628 ceases the variable frequency three-phase power provided at the output 636, and the turbine generator 604 operates in the normal operating mode. In some examples, during the normal operating mode, the controller 664 can change a state of the coupling to the deactivated state.

To initiate the coast down mode, the fuel supply to the turbine generator 604 is ceased. In some examples, in the coast down mode, the controller 664 changes a state of the circuit breaker 616 to the open state and/or changes a state of the coupling 672 to the activated state. Thus, during the coast down cycle, the shaft 674 of the turbine generator 604 rotates, inducing rotation of the shaft 676 of the AC motor 622, which in turn causes the AC motor 622 to generate AC power. That is, the AC motor 622 converts rotational inertia provided by the turbine generator 604 into AC power. The AC motor 622 provides the generated AC power to the output 636 of the VFD 620.

Additionally, to initiate the coast down mode, the controller 664 provides instructions (e.g., coast down signal) to the VFD 620. In response to these instructions, the bi-directional inverter 628 converts the three-phase AC power provided at the output 636 of the VFD 620 into DC power. Additionally, the bi-directional rectifier 624 receives this DC power through the DC link 640 and converts this DC power into three-phase AC power that has a frequency of power on the switchgear power line 644 (e.g., 60 Hz or 50 Hz). This three-phase AC power is provided at the input 632 and is transmitted through the isolation transformer 648 and the circuit breaker 652 for usage on the switchgear power line 644.

Thus, by employing the system 600, during the coast down cycle, which can last from about 28 minutes to about 60 minutes, rotational inertia (power) provided by the turbine generator 604 is converted into AC power by the AC motor 622, and this AC power is converted to DC power, and converted back to AC power for usage on the switchgear power line 644. In this manner, power that would be lost in a conventional architecture is stored, thereby increasing an overall efficiency of the system 600.

Figure 8:
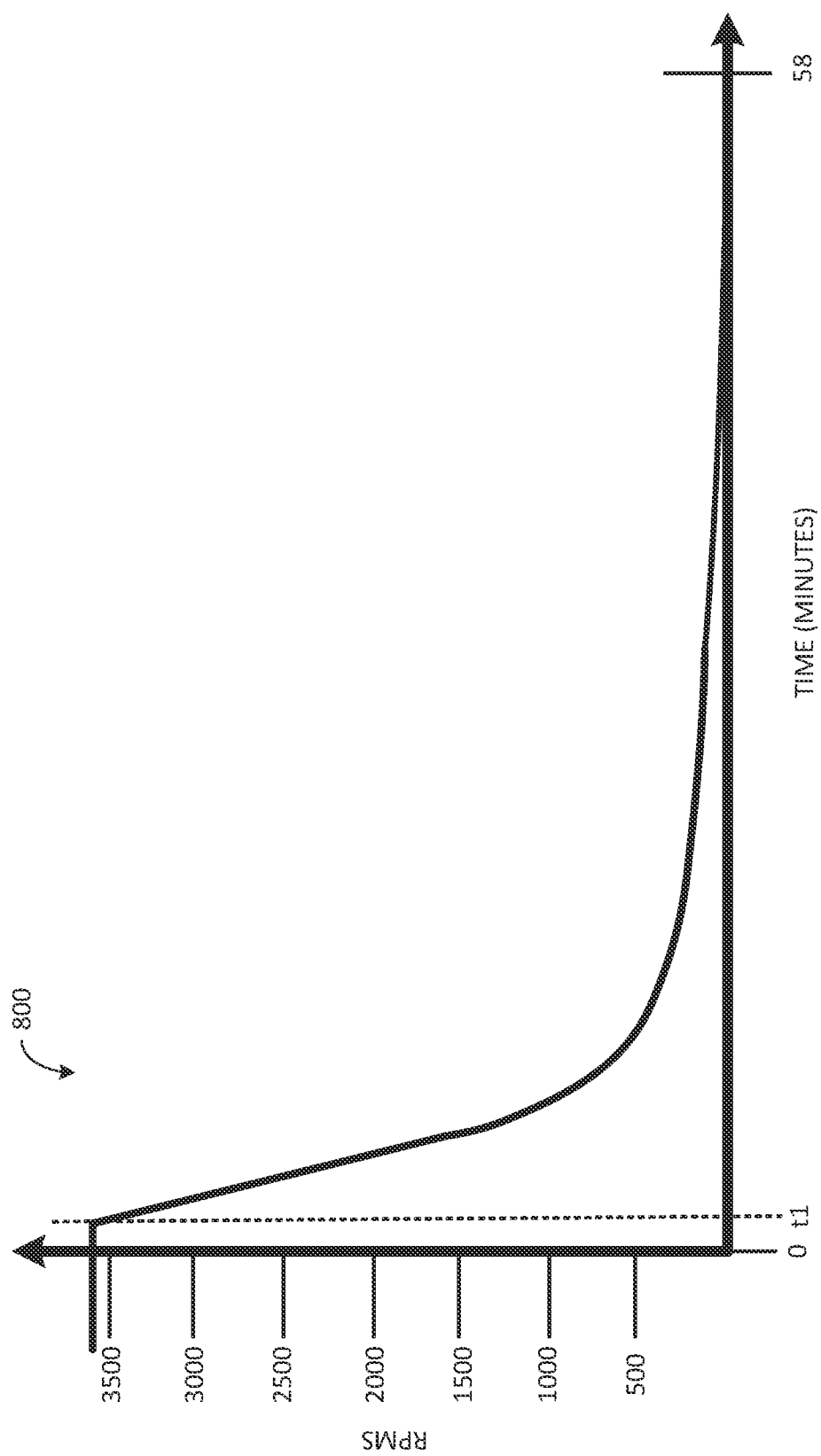
FIG. 8 illustrates a graph that plots rotations per minute (RPMs) of a turbine generator as a function of time during a coast down cycle.

FIG. 8 illustrates a graph 800 that plots RPMs of a turbine generator (e.g., the turbine generator 104 of FIG. 1) as a function of time during a coast down cycle. More particularly, it is presumed that at time t1 (near time 0), the turbine generator switches to the coast down mode. As illustrated, in the coast down mode, the turbine generator decelerates from a full rotational rate of about 3600 RPMs to 0 RPMs (stopped) over a time interval of about 58 minutes (the coast down cycle). Moreover, as illustrated, the RPMs of the turbine generator decrease exponentially (exponential decay).

Figure 9:
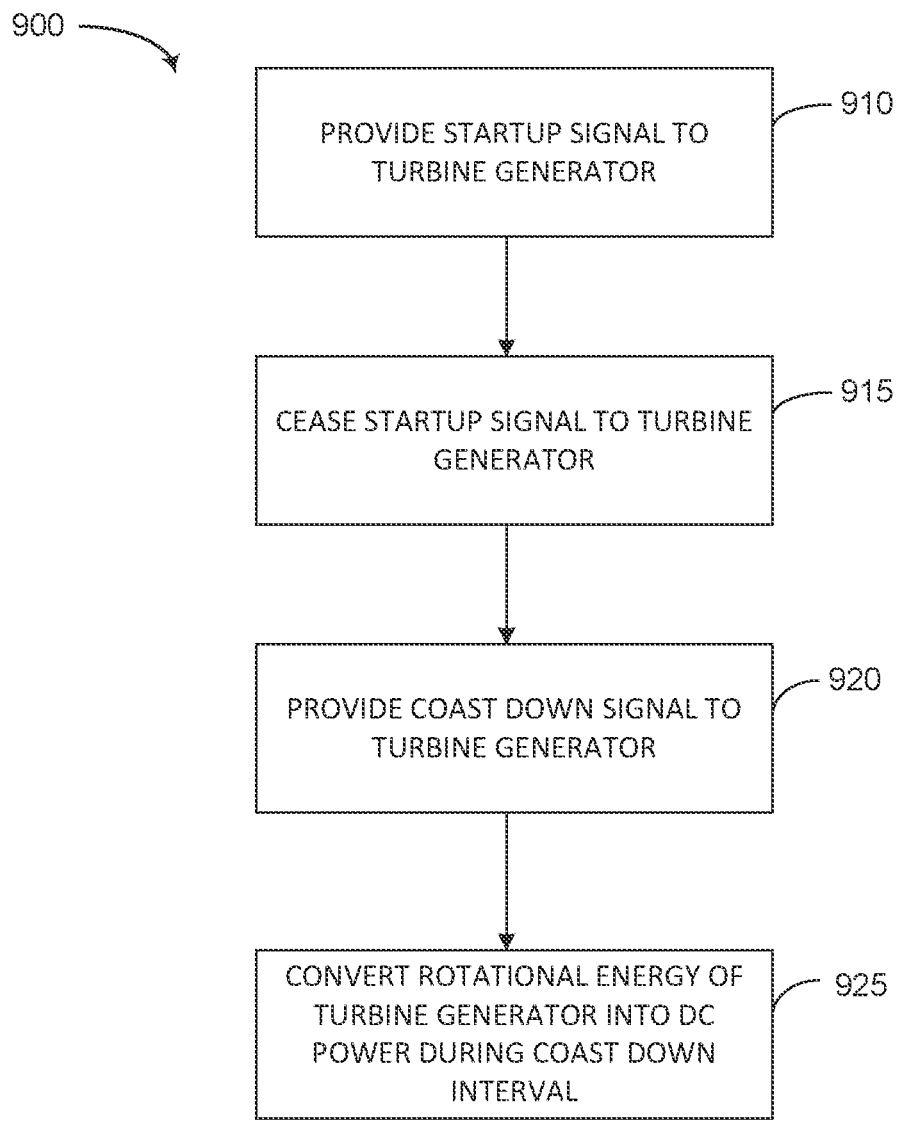
FIG. 9 illustrates a flowchart of an example method for capturing power generated by a turbine generator when the turbine generator is operating in a coast down mode.

In view of the foregoing structural and functional features described above, an example method will be better appreciated with reference to FIG. 9. While, for purposes of simplicity of explanation, the example method of FIG. 9 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 9 illustrates a flowchart of an example method 900 for capturing power generated by a turbine generator when the turbine generator is operating in a coast down mode. The method 900 can be implemented with the system 100 of FIG. 1.

At 910, a power electronics module (e.g., the power electronics module 116 of FIG. 1) provides a startup signal (e.g., three-phase variable frequency power, which is alternatively referred to as a first signal) which causes the turbine generator to switch from the off mode to a startup mode. In the startup mode, the turbine generator accelerates from a stop to a full rotational rate of about 3600 RPMs over a startup cycle. At 915, the power electronics module ceases providing the startup signal to the turbine generator, and the turbine generator operates in a normal operating mode. In the normal operating mode, the turbine generator rotates at the full rotational rate and provides the three-phase AC power to a power grid (e.g., the power grid 108 of FIG. 1).

At 920, a controller (e.g., the controller 124 of FIG. 1) provides a coast down signal (e.g., a signal and/or instructions, which is alternatively referred to as a second signal) causing the turbine generator to switch to a coast down mode. In the coast down mode, the turbine generator decelerates from the full rotational rate (e.g., 3600 RPMs) to a stop over a coast down cycle (e.g., about 28 minutes to about 60 minutes).

At 925, a power converter (e.g., the power converter 128) converts rotational inertia provided by the turbine generator during the coast down cycle into DC power. In some examples, this DC power is stored (e.g., in a battery bank, such as the battery bank 132 of FIG. 1). In other examples, this DC power is converted into AC power for use on a switchgear power line (e.g., the switchgear power line 120 of FIG. 1).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first," or "another" element, or the equivalent thereof, it should be interpreted to include one or more than one such element, neither requiring nor excluding two or more such elements. Further, unless otherwise stated, in this description, 'about' preceding a value means+/−10 percent of the stated value.

What is claimed:

1. A system for generating power comprising:
a turbine generator to generate alternating current (AC) power;
a power electronics module that provides a first signal to switch an operating mode of the turbine generator from an off mode to a startup mode, wherein the first signal is variable frequency power;
a controller that provides a second signal that causes the turbine generator to switch from a normal operating mode to a coast down mode, wherein in the startup mode, the turbine generator accelerates from a stop to a full rotational rate to operate in the normal operating mode, in the normal operating mode, the turbine generator rotates at the full rotational rate and provides the AC power to a power grid, and in the coast down mode, the turbine generator decelerates from the full rotational rate to a stop over an interval of time; and
a converter that converts electrical or mechanical power resulting from rotational inertia of the turbine generator into direct current (DC) power responsive to the turbine generator operating in the coast down mode.

2. The system of claim 1, wherein the power electronics module is a static frequency converter (SFC) that provides the first signal to the turbine generator.

3. The system of claim 2, wherein the SFC comprises:
a rectifier that converts AC power from a switchgear power line into DC power; and
a bi-directional inverter that converts DC power provided from the rectifier to cause the turbine generator to operate in the startup mode, and the bi-directional inverter converts AC power corresponding to the electrical power generated by the turbine generator in the coast down mode into DC power, wherein the bi-directional inverter is the converter.

4. The system of claim 3, wherein:
the SFC further comprises a DC link coupled between the rectifier and the bi-directional inverter; and
the system further comprises a battery bank coupled to the DC link, wherein the battery bank stores DC power provided from the bi-directional inverter through the DC link.

5. The system of claim 2, wherein the SFC comprises:
a bi-directional rectifier that converts AC power from a switchgear power line into DC power; and
a bi-directional inverter that converts DC power provided from the bi-directional rectifier into AC power to cause the turbine generator to operate in the startup mode, and the bi-directional inverter converts AC power corresponding to the electrical power generated by the turbine generator in the coast down mode into DC power, wherein the bi-directional inverter is the converter;

wherein the bi-directional rectifier converts DC power provided from the bi-directional inverter into AC power provided to the switchgear power line.

6. The system of claim 5, wherein the switchgear power line and the bi-directional rectifier are coupled through a transformer, and the switchgear power line and the power grid have different voltages.

7. The system of claim 1, wherein the converter comprises a DC generator coupled to a shaft and configured to receive the mechanical power resulting from the rotational inertia of the turbine generator during the interval of time, wherein the DC generator converts the mechanical power into DC power responsive to the turbine generator operating in the coast down mode.

8. The system of claim 7, further comprising:
a DC-DC converter coupled to the DC generator; and
a battery bank coupled to the DC-DC converter, wherein the battery bank stores the DC power generated by the DC generator that is adjusted by the DC-DC converter.

9. The system of claim 8, further comprising a switch coupled between the power electronics module and the turbine generator, wherein the switch is closed during intervals of time that the turbine generator is operating in the normal operating mode and the switch is opened during the interval of time.

10. The system of claim 1, wherein the power electronics module is a variable frequency drive (VFD), and the converter comprises:
an AC motor that receives the first signal and the AC motor is mechanically coupled to the turbine generator, the AC motor configured to receive the mechanical power resulting from the rotational inertia of the turbine generator, and wherein the AC motor converts the mechanical power into AC power that is provided to the VFD.

11. The system of claim 10, wherein the VFD comprises:
a bi-directional rectifier that converts AC power from a switchgear power line into DC power; and
a bi-directional inverter that converts DC power provided from the bi-directional rectifier into AC power to the AC motor mechanically coupled to the turbine generator to cause the turbine generator to operate in the startup mode, and the bi-directional inverter converts the AC power generated by the AC motor in the coast down mode into DC power;
wherein the bi-directional rectifier converts DC power provided from the bi-directional inverter into AC power provided to the switchgear power line.

12. The system of claim 1, wherein the first signal is a three-phase power signal, and the interval of time is at least 28 minutes.

13. A system for generating power comprising:
a turbine generator to generate alternating current (AC) power, the turbine generator being coupled to a power grid through a first transformer;
a power electronics module coupled to a switchgear power line that switches the turbine generator from an off mode to a startup mode;
a controller that switches the turbine generator from a normal operating mode to a coast down mode, wherein in the startup mode, the turbine generator accelerates from a stop to a full rotational rate to operate in the normal operating mode, in the normal operating mode, the turbine generator rotates at the full rotational rate and provides the AC power to the power grid, and in the coast down mode, the turbine generator decelerates from the full rotational rate to a stop over an interval of time; and
the power electronics module converts electrical or mechanical power resulting from rotational inertia of the turbine generator into DC power responsive to the turbine generator operating in the coast down mode.

14. The system of claim 13, wherein the power electronics module is a static frequency converter (SFC), and the SFC comprises:
a rectifier that converts AC power from the switchgear power line into DC power; and
a bi-directional inverter that converts DC power provided from the rectifier to cause the turbine generator to operate in the startup mode, and the bi-directional inverter converts AC power corresponding to the electrical power generated by the turbine generator in the coast down mode into DC power.

15. The system of claim 14, further comprising:
a DC link coupled between the rectifier and the bi-directional inverter; and
a battery bank coupled to the DC link, wherein the battery bank stores DC power provided from the bi-directional inverter through the DC link.

16. The system of claim 13, wherein the power electronics module comprises:
a bi-directional rectifier that converts AC power from a switchgear electrical line into DC power; and
a bi-directional inverter that converts DC power provided from the bi-directional rectifier into AC power to cause the turbine generator to operate in the startup operating mode, and the bi-directional inverter converts AC power corresponding to the electrical power into DC power;
wherein the bi-directional rectifier converts DC power provided from the bi-directional inverter into AC power that is provided to the switchgear electrical line.

17. A method for generating electrical power comprising:
providing, from a power electronics module, a startup signal to cause a turbine generator to switch from an off mode to a startup mode causing the turbine generator to accelerate from a stop to a full rotational rate in a normal operating mode, wherein the startup signal is variable frequency power;
ceasing, by the power electronics module, the startup signal, and the turbine generator operates in a normal mode and rotates at the full rotational rate and provides alternating current (AC) power to a power grid;
providing, from a controller, a coast down signal causing the turbine generator to switch from the normal operating mode to a coast down mode, wherein the turbine generator decelerates from the full rotational rate to a stop over an interval of time; and
converting, by a converter, electrical or mechanical power resulting from rotational inertia of the turbine generator during the interval of time into direct current (DC) power.

18. The method of claim 17, wherein the method further comprises storing the DC power in a battery bank.

19. The method of claim 17, wherein the method further comprises converting, by an inverter of the power electronics module, the DC power into AC power for a switchgear power line.

20. The method of claim 17, wherein the startup signal is three-phase power.

* * * * *